United States Patent [19]
Miyazaki et al.

[11] Patent Number: 5,994,881
[45] Date of Patent: Nov. 30, 1999

[54] CONTROL APPARATUS FOR A SYNCHRONOUS GENERATOR SYSTEM AND A HYBRID-TYPE ELECTRIC VEHICLE USING IT

[75] Inventors: Taizou Miyazaki; Ryoso Masaki, both of Hitachi; Satoru Kaneko, Urizura-machi; Kazuyoshi Sasazawa, Hitachinaka; Sanshiro Obara, Tokai-mura; Nobunori Matsudaira, Hitachi, all of Japan

[73] Assignee: Hitachi, Ltd., Tokyo, Japan

[21] Appl. No.: 08/946,580

[22] Filed: Oct. 7, 1997

[51] Int. Cl.⁶ .................................................. H02P 9/04
[52] U.S. Cl. ........................................... 322/16; 290/40 C
[58] Field of Search ................................. 322/14, 15, 16, 322/20, 29; 290/40 C

[56] References Cited

U.S. PATENT DOCUMENTS

| | | | |
|---|---|---|---|
| 5,384,527 | 1/1995 | Rozman et al. | 322/10 |
| 5,428,274 | 6/1995 | Furutani et al. | 318/139 |
| 5,495,162 | 2/1996 | Rozman et al. | 322/10 |
| 5,545,928 | 8/1996 | Kotani | 290/40 C |
| 5,550,445 | 8/1996 | Nii | 318/153 |
| 5,726,559 | 3/1998 | Taniguchi et al. | 322/34 |
| 5,798,631 | 8/1998 | Spee et al. | 322/25 |
| 5,903,061 | 5/1999 | Tsuzuki et al. | 290/40 C |

FOREIGN PATENT DOCUMENTS

9-163507  6/1997  Japan .

*Primary Examiner*—Nicholas Ponomarenko
*Attorney, Agent, or Firm*—Evenson, McKeown, Edwards & Lenahan, PLLC

[57] ABSTRACT

A control apparatus for a synchronous generator system has: a voltage instruction generator for generating voltage instructions ($V_u^*$, $V_v^*$, $V_w^*$) based on an output power reference ($P^*$) of the synchronous generator, currents ($I_u$, $I_v$) flowing through the synchronous generator and position information ($\theta_0$, $\omega_r$) of magnetic poles of the synchronous generator; a zero crossing point detector for detecting a point that the voltage ($V_u$) of the synchronous generator passes through zero volt.; and a magnetic pole position calculator for calculating the information ($\theta_0$, $\omega_r$) on the position of magnetic poles of the synchronous generator on the basis of the voltage instruction ($V_u^*$) and the power reference ($P^*$) when the synchronous generator is under the generation mode, and on the basis of an output signal of the zero crossing point detector when the synchronous generator is under the stand-by mode.

18 Claims, 9 Drawing Sheets

CONTROL APPARATUS FOR A SYNCHRONOUS GENERATOR SYSTEM AND A HYBRID-TYPE ELECTRIC VEHICLE USING IT

BACKGROUND OF THE INVENTION

1. Field of the Invention

The present invention relates to a control apparatus for a synchronous generator system for converting kinetic energy to electric power, and more particularly to a control apparatus which does not require the provision any sensor, such as an encoder, hole elements and so on, for detecting the position of rotating magnetic poles of a synchronous generator. Further, the present invention relates to a hybrid-type electric vehicle, to which the synchronous generator control apparatus as mentioned above is applied.

2. Description of Related Art

There is known a hybrid-type electric vehicle, in which an internal combustion engine as well as an electric motor and/or generator are used in combination as a driving power source, for the purpose of improving the fuel consumption and the exhaust gas purification. In such an electric vehicle, it is desired that an electric vehicle under a standstill state can only be started electrically.

By the way, as a motor or a generator for use in an electric vehicle of this kind, a synchronous type machine is usually utilized. As is well known, the positional relationship between a stator and a rotor thereof must necessarily to be found, in order to operate the synchronous machine.

In a conventional control apparatus of this kind, there has been provided a position sensor for detecting the position of rotating magnetic poles of a synchronous machine. However, such a position sensor is very expensive, with the result that the whole cost of the control apparatus increases. Further, such a sensor also increases the size of the control apparatus as a whole.

To solve the problems as described above, the Japanese Patent Application laid-open No. 9-163507 (published Jun. 20, 1997) proposes a so called sensorless synchronous machine system, in which a control computer carries out a predetermined processing to presume the position of magnetic poles of a synchronous machine.

It is well known that the voltage induced across a winding of a certain phase has a phase difference of 90° from the magnetic flux produced by a magnetic pole. The prior art as disclosed in the JP-A-9-163507 utilizes the aforesaid known fact, and the control computer takes therein a signal concerning the induced voltage and executes a predetermined processing to presume the position of the magnetic poles.

However, the prior art as described above operates on the assumption that the phase difference between the phase voltage and the magnetic flux is equal to 90°. This assumption is quite correct under the condition wherein a synchronous machine is not loaded. However, the phase difference does not become equal to from 90°, as a load current flows through the synchronous machine. Namely, the position of the magnetic poles can not be presumed exactly under the loaded condition of the synchronous machine.

SUMMARY OF THE INVENTION

An object of the present invention is to provide a control apparatus for a synchronous generator system, wherein A.C. electric power produced by a synchronous generator is converted by a converter into D.C. electric power, in which the position of magnetic poles of the synchronous generator can be sensed without using any expensive position sensor or the like even under a loaded condition of the generator.

According to a feature of the present invention, voltage instructions ($V_u^*$, $V_v^*$, $V_w^*$) for controlling the converter are created by using a reference $P^*$ of power to be produced by the synchronous generator, currents ($I_u$, $I_v$) flowing through the synchronous generator, and information ($\theta_0$, $\omega_r$) concerning the position of magnetic poles of the synchronous generator. Further, the point, at which the voltage passes through zero, is detected. The information ($\theta_0$, $\omega_r$) concerning the magnetic pole position is produced on the basis of the voltage instruction ($V_u^*$, $V_v^*$, $V_w^*$) and the power reference $P^*$ when the synchronous generator is operating in a generation mode, and on the basis of an output of the zero crossing point detector when the synchronous generator is operating in a stand-by mode.

According to another feature of the present invention, when the synchronous generator is under the generation mode, the information ($\theta_0$, $\omega_r$) concerning the position of magnetic poles is calculated based on the power reference $P^*$ as well as the currents ($I_u$, $I_v$) flowing through the synchronous generator, instead of the voltage instruction ($V_u^*$, $V_v^*$, $V_w^*$).

As described above, according to the present invention, information concerning the position of magnetic poles of a synchronous generator, which is necessarily required for the operation thereof, can be calculated based on the information concerning the voltage or the current. Accordingly, a position sensor such as an encoder becomes unnecessary, whereby a control apparatus for a synchronous generator becomes small in size and its manufacturing cost can be decreased. Further, the speed of processing, i.e., detection of the position of magnetic poles, can be much improved, compared with the conventional system.

The characteristic features as mentioned above are advantageous to an electric vehicle, because space for apparatuses is very limited and the high speed processing is required.

DESCRIPTION OF THE PREFERRED EMBODIMENT

In the following, description will be made of embodiments of the present invention, referring to the accompanying drawings.

Figure 1A:
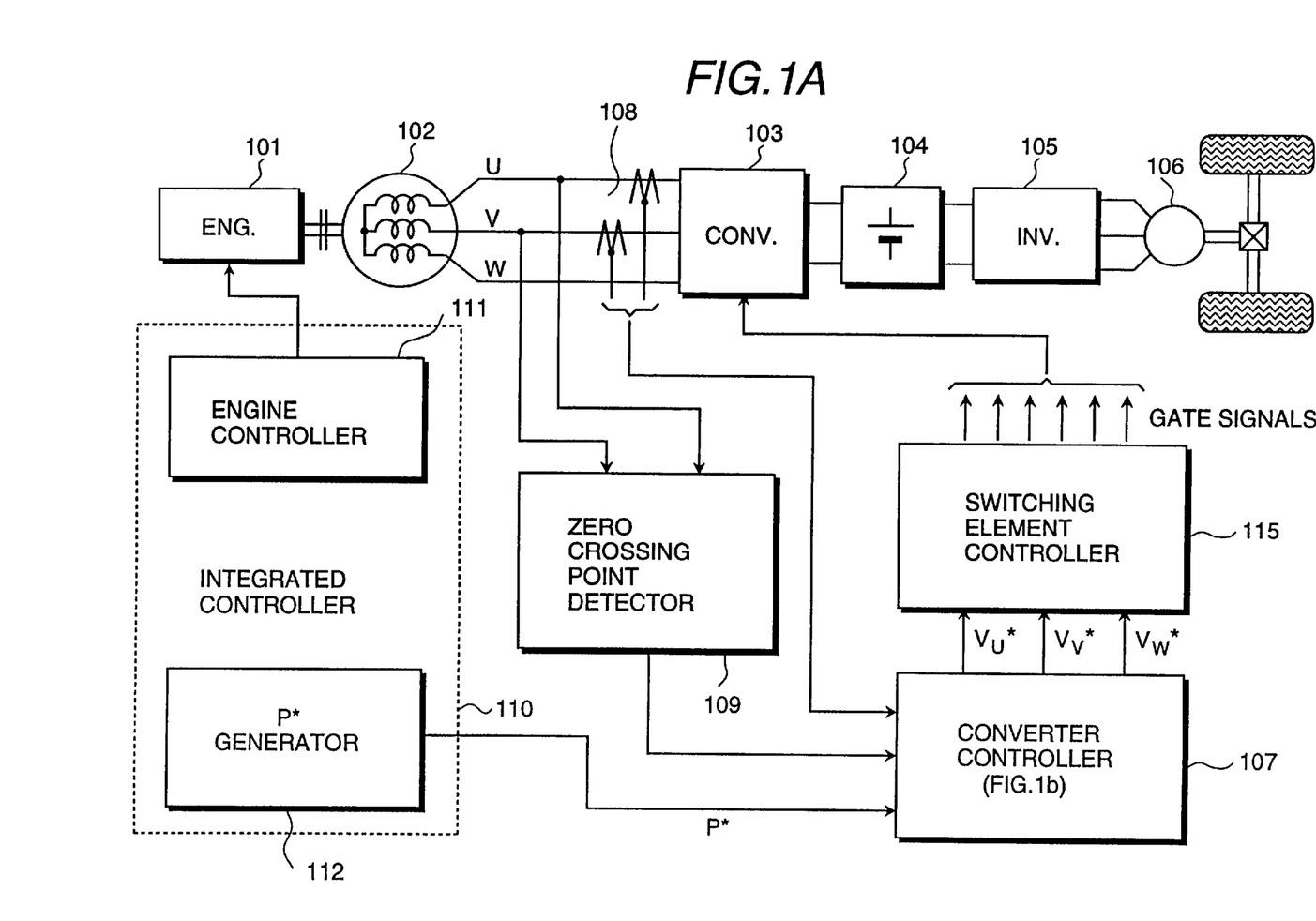
FIGS. 1A and 1B are block diagrams showing a control apparatus for a synchronous generator system according to an embodiment of the present invention, which is applied to a hybrid-type electric vehicle.
Figure 1B:
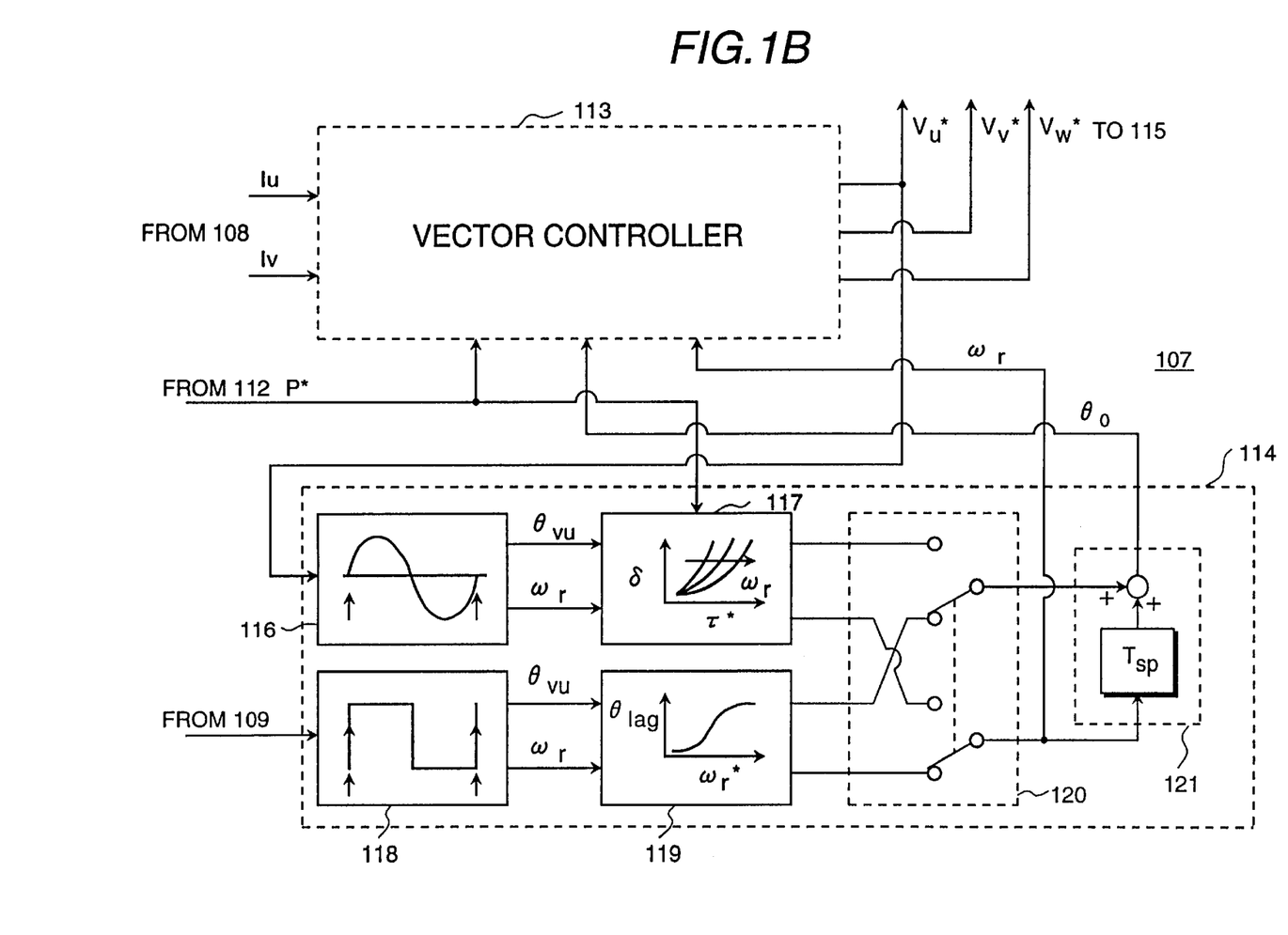

FIG. 1A shows the whole arrangement of a control apparatus for a synchronous generator system according to an embodiment of the present invention, which is applied to a hybrid-type electric vehicle. FIG. 1B shows the detailed arrangement of converter controller 107 used in the control apparatus as shown in FIG. 1A.

Referring at first to FIG. 1A, reference numeral 101 denotes kinetic energy generating means. Although in this embodiment, an internal combustion engine is used as means 101, an external combustion engine such as a gas turbine and a Stirling engine, as well as kinetic energy storing means such as a fly wheel, can be also utilized. In the following, means 101 will be simply referred to as an engine.

Reference numeral 102 denotes a synchronous generator. The generator 102 is mechanically coupled with the engine 101 and converts kinetic energy produced thereby to generate A.C. electric power. In the electric vehicle of this type, every kind of generator can be used for the generator 102, for example, a synchronous generator, a switched reluctance generator, a brushless D.C. generator and so on.

Reference numeral 103 denotes a power converter, which is subjected to a well known vector control and converts the A.C. electric power produced by the synchronous generator 102 into D.C. electric power. Since a well known converter can be utilized as the converter 103, further description thereon is omitted.

The thus obtained D.C. electric power is stored in energy storing means 104. As means 104, a known secondary battery is usually used, such as a lead battery, a nickel battery and so on.

Reference numeral 105 denotes an inverter, which is also subjected to a known vector control and inverts the D.C. electric power stored in the battery 104 to A.C. electric power. The thus obtained A.C. electric power is fed to driving motor 106. A controller for the inverter 105 is not shown in the drawing and description thereon is omitted either, for simplification.

Reference numeral 107 denotes a converter controller, which carries out a predetermined processing operation in accordance with the vector control based on signals from current sensor 108 and a signal from zero crossing point detector 109. Thereby, the controller 107 produces voltage instructions $V_U^*$, $V_V^*$, $V_W^*$. On the converter controller 107, further details will be described later, referring to FIG. 1B.

The zero crossing point detector 109 as mentioned above takes therein signals concerning the voltage of the phases U, V and detects the time point when the interphase voltage $V_{U-V}$ becomes zero. More exactly, the detector 109 detects the point, at which the interphase voltage $V_{U-V}$ passes through zero, when it changes from a negative toward a positive value.

The voltage to be detected is not limited to the interphase voltage $V_{U-V}$, but it can be an interphase voltage between two phases other than the U, V phases, or a phase voltage between a neutral point of the synchronous generator 102 and a certain phase is available for this purpose. Detailed arrangement of the zero crossing point detector 109 will be described later, referring to FIG. 6.

Reference numeral 115 denotes a switching element controller, which produces gate signals to switching elements of the converter 103 for operating the converter 103 on the PWM control basis, in accordance with the voltage instructions $V_U^*$, $V_V^*$, $V_W^*$ supplied by the converter controller 107.

Reference numeral 110 denotes an integrated controller, which carries out the total control for the electric vehicle. The integrated controller 110 includes engine controller 111 and power reference generator 112. As the engine controller 111, a known engine control apparatus can be utilized, which controls the rotational speed of the engine 101 and hence that of the generator 102. The power reference generator 112 produces the reference P* of the load or power to be burdened by the synchronous generator 102, which is led to the converter controller 107.

Further, the power reference P* can be given in terms of the torque reference τ*. It is to be noted that as is well known, there is the reciprocal relationship between the power P and the torque τ as shown by the following equation:

$$P = \omega \times \tau$$

wherein ω denotes a mechanical angular speed of a generator.

The integrated controller 110 calculates the speed instruction and the power reference P* for the synchronous generator 102, based on a reference of the electric power to be produced by the synchronous generator 102. The electric power reference is given externally in the form of a depression amount of an acceleration pedal by a driver, for example. For the simplification of control, it is very usual that the power reference P* is kept constant and the speed instruction is varied in accordance with the electric power reference given by a driver.

Referring next to FIG. 1B, a detailed description will be given of the converter controller 107.

The converter controller 107 is composed of voltage instruction generator 113 and magnetic pole position calculator 114. As the voltage instruction generator 113, a known device for the so called vector control can be utilized. So, in the figure, this is referred to as a vector controller.

The controller 113 takes therein signals $I_u$, $I_v$ from the current sensor 108 and the power reference P* from the reference generator 112, as well as a phase signal $\theta_0$ of the magnetic pole position and an angular speed $\omega_r$ thereof, both being produced by the magnetic pole position calculator 114, which will be described later. Based on the various signals taken therein, the vector controller 113 produces the voltage instructions $V_U^*$, $V_V^*$, $V_W^*$ to the switching element controller 115.

The magnetic pole position calculator 114 comprises voltage phase calculator 116, first magnetic pole position phase calculator 117, induced voltage phase calculator 118 and second magnetic pole position phase calculator 119, in which the first two calculators are prepared for the generation mode and the last two calculators for the stand-by mode.

The generation mode as mentioned above is the mode where there exists the power reference P* from the power reference generator 112, and the synchronous generator 102 operates under the control based thereon. The stand-by mode is the mode that a signal of the phase $\theta_0$ of the magnetic pole position of the synchronous generator 102 can not be obtained; the case where the synchronous generator 102 is apt to start and the case where the synchronous generator 102 falls into the loss of synchronism, for example.

The calculator 114 further comprises mode switch-over device 120 and sampling error correction device 121. The sampling error correction device 121 is required, when the magnetic pole position calculation is realized by the sampling control using a microcomputer. The sampling error correction device 121 serves to correct the difference occurring between the phase of an actual magnetic pole position and the phase of the voltage instruction, which corresponds to one sampling period $T_{SP}$.

In the following, description will be made of the principle of the operation of calculating the position of magnetic poles of the synchronous generator 102.

Figure 2:
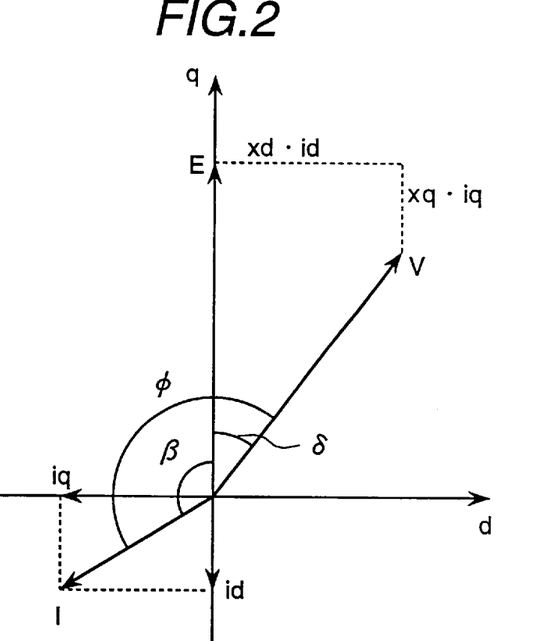
FIG. 2 is a vector diagram showing various kinds of vectors and a relationship there among under the steady state of a synchronous generator.

It is well known that when various amounts in a synchronous machine under the steady state are indicated in the rotatory coordinate system popularly used in this field, there exists the relationship as shown in the vector diagram of FIG. 2 thereamong, wherein I indicates the U-phase current, V the U-phase terminal voltage and E the voltage induced across the U-phase winding of the synchronous machine. The phase current is defined as the direction flowing into the synchronous machine being positive. Further, it is known that the direction of the induced voltage E agrees with that of magnetic poles.

As shown in FIG. 2, assuming that the angle of phase difference between the induced voltage E and the phase voltage V is indicated by $\delta$, the angle between the phase current I and the phase voltage V by $\phi$, and the advance angle between the induced voltage E and the phase current I by $\beta$, and the q-axis impedance at a certain rotational speed by xq, the following equation is established:

$$\delta = \tan^{-1}\{|I| \cdot xq \cdot \cos \omega / (|V| + |I| \cdot xq \cdot \sin \phi)\} \quad (1)$$

$$\phi = \beta + \delta \quad (2)$$

If a power reference, a rotational speed reference and a phase voltage V are given, the relationship of various vectors is determined automatically as shown in FIG. 2 in accordance with the characteristics of the synchronous generator 102. According thereto, the advance angle $\beta$ at this time or the phase difference angle $\delta$ also becomes known.

Accordingly, by subtracting the advance angle $\beta$ from the phase angle $\theta_{Iu}$ of the U-phase current I or by adding the phase difference angle $\delta$ to the phase angle $\theta_{Vu}$ of the U-phase voltage V, the phase angle in the q-axis direction is obtained, which means the phase of the magnetic pole position.

As is well known, it is desirable that a synchronous generator is always operated with its maximum efficiency kept. Therefore, the phase voltage V is selected such that the synchronous generator 102 shows the maximum efficiency at every operating point. Based on the thus selected phase voltage V, the advance angle $\beta$ and the phase difference angle $\delta$ are obtained.

With respect to the phase difference angle $\delta$, for example, it is determined in response to the amount P of power to be produced by the generator 102 and the rotational speed $\omega$ of the engine 101. Namely, the phase difference angle $\delta$ can be obtained as a predetermined function of variables like P and $\omega$. The same can be also applied to the advance angle $\beta$.

Now, the phase difference angle $\delta$ and the advance angle $\beta$ can be obtained in accordance with predetermined functions based on the variables at that time. Desirably, however, there are provided tables by the simulation conducted in advance on the basis of the predetermined functions. During the actual operation, the phase difference angle $\delta$ and the advance angle $\beta$ can be obtained by just looking up the tables provided in advance. This makes it possible to quickly know the position of magnetic poles.

As described above, if the phase of the current or the phase of the voltage can be found, the position of magnetic poles can easily be known. In the arrangement as shown in FIGS. 1A and 1B, the phase of the magnetic pole position is calculated based on the phase of the voltage instruction.

The reason therefor is as follows. If the power reference P* is zero, the current also becomes zero, with the result that it becomes impossible to detect the phase of the current. However, information concerning the voltage can be obtained, whenever the synchronous generator 102 rotates. By using the voltage instruction, therefore, the magnetic pole position can be calculated even if the power reference P* is zero.

In FIG. 1B, the voltage phase calculator 116 for the generation mode produces the voltage phase $\theta_{Vu}$ and the angular speed $\omega_r$ thereof. The magnetic pole position phase calculator 117 produces the phase difference angle $\delta$ by looking up the table, based on the power reference P* and the angular speed $\omega_r$ of the voltage phase. The operation of the voltage phase calculator 116 will be explained, referring to FIGS. 3A and 3B.

Figure 3A:
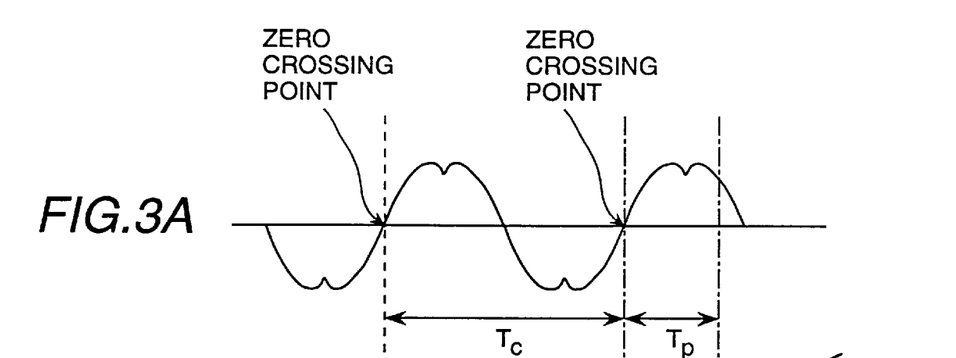
FIGS. 3A and 3B are drawings for explaining the operation of a voltage phase calculator used in the embodiment as shown in FIGS. 1A and 1B.

The calculator 116 takes therein the U-phase voltage instruction $V_u^*$ for every constant sampling period and detects a rising zero crossing point in the waveform thereof. As shown in FIG. 3A, assuming that time interval between two rising zero crossing points $t_1$, $t_2$ next to each other is indicated by $T_c$ and time from the last rising zero crossing point $t_1$ to the present time $t_0$ by $T_p$, the phase angle $\theta_{Vu}$ of the U-phase voltage, the angular speed $\omega_V$ thereof, the angular speed $\omega_r$ of the phase of the magnetic pole position and the mechanical angular speed N are expressed by the following equations:

$$\theta_{Vu} = 2\Pi T_p / T_c (\text{rad}) \quad (3)$$

$$\omega_r = \omega_V = 2\Pi / T_c (\text{rad/sec}) \quad (4)$$

$$N = 60/p \cdot T_c (\text{min}^{-1}) \quad (5)$$

wherein p denotes the number of pairs of the magnetic poles.

Further, various time intervals as mentioned above can be easily measured by a free running counter included in a microcomputer, for example.

In the foregoing, the angular speed $\omega_V$ of the voltage phase is defined as being equal to the angular speed $\omega_r$ of the phase of the magnetic pole position, as shown in the equation (4). It is to be noted that this equation is true only during the steady state of the synchronous generator 102 and not strictly exact for every state thereof. However, it does not matter in practical application, since the synchronous generator 102 is usually operated under such a condition that there does not occur a sudden change in the rotational speed, which is different from the case of a motor.

The voltage phase angle $\theta_{Vu}$ and the angular speed $\omega_r$ of the phase of the magnetic pole position are led to the magnetic pole position calculator 117, in which $\delta$ is at first obtained by looking up the table prepared in advance on the basis of P* and $\omega_r$ taken therein. Further, based on the thus obtained $\delta$, the position $\theta_0$ of the magnetic pole is calculated by the following equation:

$$\theta_{Vu} + \delta - \Pi/2 = \theta_0 \quad (6)$$

Further, the voltage phase angle $\theta_{Vu}$ is obtained based on the rising zero crossing point of the voltage instruction. This is for the purpose of ease in reduction to practice. Other than this, however, a differentiated value or an integrated one of the voltage instruction and so on can also be utilized.

Usually, the calculation of the zero crossing point is done by using a microcomputer. The voltage instruction is calculated by the microcomputer for every constant time interval of interruption. Accordingly, the voltage instruction has the nature of a discrete information. In the following, referring to FIG. 4, description will be given of the method how to calculate the rising zero crossing point precisely based on such discrete information.

Figure 4:
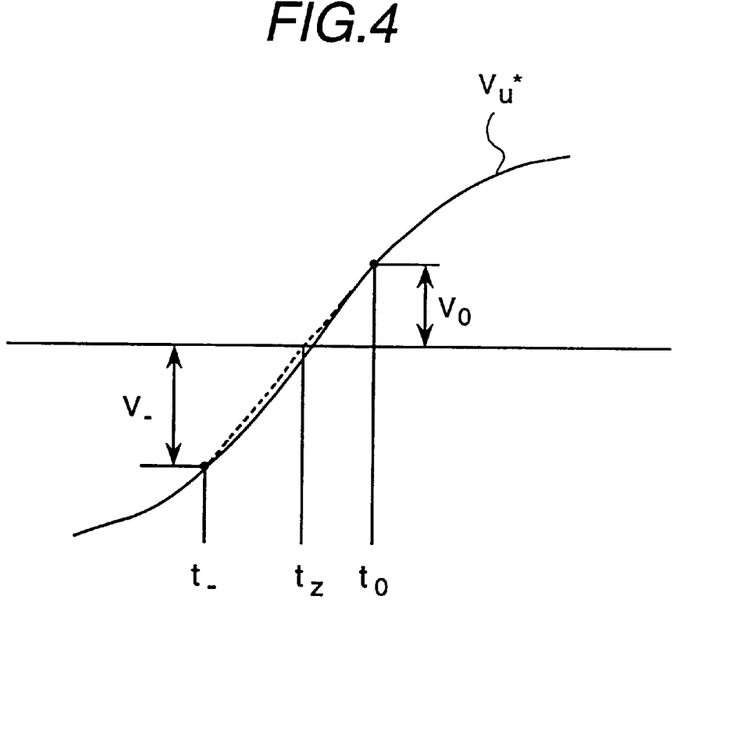
FIG. 4 is a drawing for explaining the principle of a method of calculating a zero crossing point based on the discrete information.

FIG. 4 shows a part of the waveform of the voltage instruction $V_u^*$. In the figure, the zero crossing point $t_z$ is approximated as follows;

$$t_Z = (V_- \cdot t_0 + V_0 \cdot t_-)/(V_- + V_0) \tag{7}$$

wherein $t_-$ is the time point of sampling of the last time, $V_-$ the value of the voltage instruction at $t_-$, $t_0$ the time point of sampling of this time, and $V_0$ the value of the voltage instruction at $t_0$.

Conventionally, it has been only presumed that there exists a zero crossing point between $t_-$ and $t_0$, from the fact that $V_-$ is negative and $V_0$ is positive. And, either one of $t_-$ and $t_0$ has been regarded as a zero crossing point. Accordingly, there could occur a maximum error equal to a whole period of time for sampling. With the method as shown in FIG. 4, the detection of a zero crossing point becomes much more precise, whereby the accuracy of the calculation of the magnetic pole position is much improved.

Next, the sampling error corrector 121 will be explained, which is also achieved by the microcomputer. Without the sampling error corrector 121, the magnetic pole position calculator 114 takes therein the voltage instruction at the sampling time point $t_2$ and calculates the phase of the magnetic pole position based thereon (cf. FIG. 3A). The thus calculated phase of the magnetic pole position is reflected on the processing in the vector controller 113 at the next sampling time point $t_1$ (cf. FIG. 3A).

Assuming that the electric angular speed, i.e., the angular speed of the phase of the magnetic pole position, is represented by $\omega_r$ and the sampling period of time by $T_{sp}$, the amount of the error in phase caused by the sampling operation becomes $T_{sp} \times \omega_r$. Therefore, the correction can be attained by adding the product of the sampling period of time and the angular speed of the phase of the magnetic pole position to the phase of the magnetic pole position.

Figure 3B:
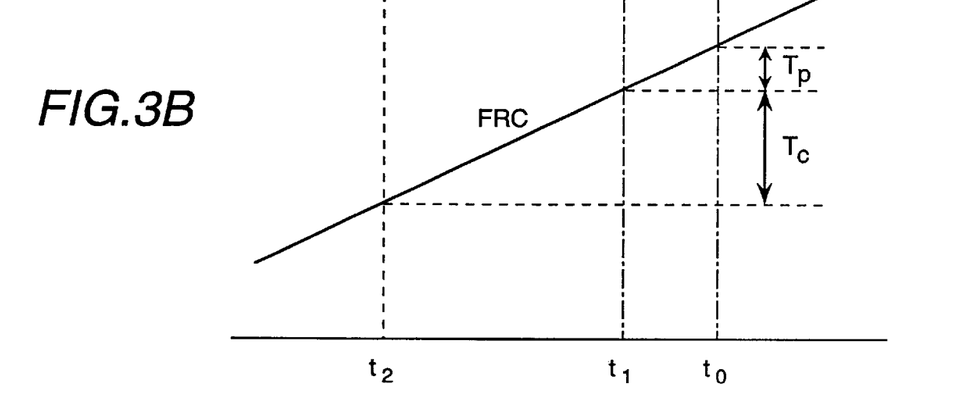

FIGS. 3A and 3B show the utilization of the U-phase voltage instruction only, in order to obtain the angle $\theta_{Vu}$ of the voltage phase. Further, to obtain the voltage phase angle $\theta_{Vu}$, the voltage instructions of the phases V and W can also be utilized. Further, if the voltage instructions of all three phases are utilized, a zero crossing point can be checked every 120°, whereby the detection accuracy can be increased.

Figure 5:
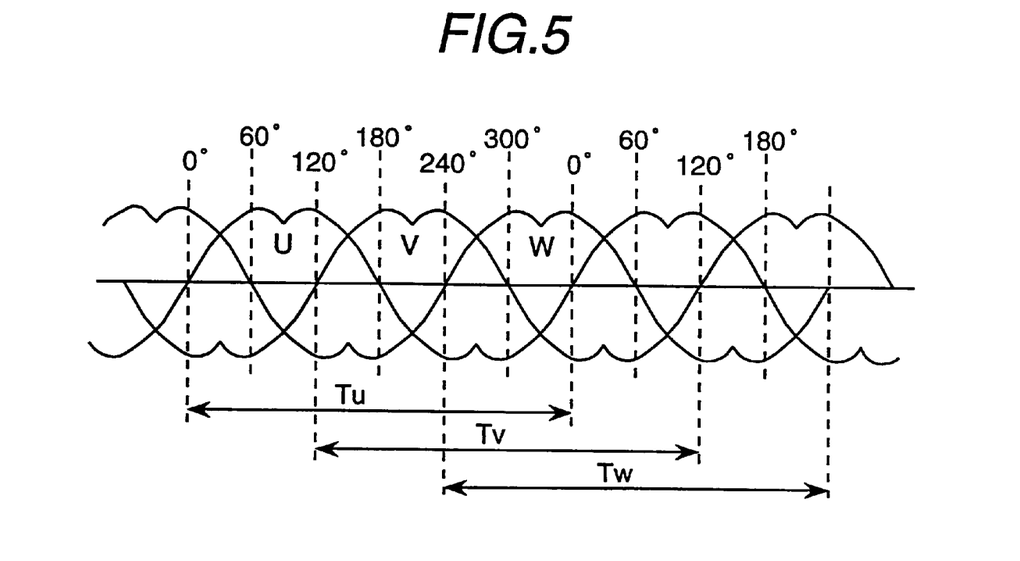
FIG. 5 shows waveforms of voltages of a three phase synchronous generator.

In FIG. 5, there is shown the waveforms of output voltage of a three phase synchronous generator during the steady state. As apparent from the figure, if a rising zero crossing point in the U-phase voltage is defined as a reference point (0°) of the voltage phase angle, there occur rising zero crossing points or falling zero crossing points every 60° through all three phase voltages U, V and W.

If, therefore, the voltages of all three phases are taken in the voltage phase calculator 116 for the generation mode, the angle $\theta_{Vu}$ of the voltage phase can be checked every 60°. By way of example, even if the speed changes at the position of 30° and hence there occurs the error between the true angle $\theta_{Vu}^*$ of the voltage phase and that $\theta_{Vu}'$ actually obtained by the calculation, the calculated $\theta_{Vu}'$ can be corrected at the position of 60°. Further, as shown in the figure, since the rising zero crossing point in the voltage of the respective phases appears every 120° in succession, the angular speed $\omega_V$ can be renewed by a correct value every 120°.

As described above, the position, and hence the speed also, can be calculated more accurately by utilizing the information of all three phase voltages of the three phase synchronous generator. In this case, however, it will be easily understood that the information of any two out of the three phase voltage are sufficient to be taken, because there exists the known relationship of $V_u + V_v + V_w = C$ (C: constant) in the three phase voltages.

In the following, description will be made of the operation in the stand-by mode.

In the case where the position of the magnetic poles is to be calculated by utilizing the phase of current, the calculation becomes impossible, when the converter 103 does not operate and hence there is no current flowing in the synchronous generator 102. The stand-by mode is the mode that even under the situation as mentioned above, the position of magnetic poles can be calculated by the zero crossing point detector 109.

Figure 6:
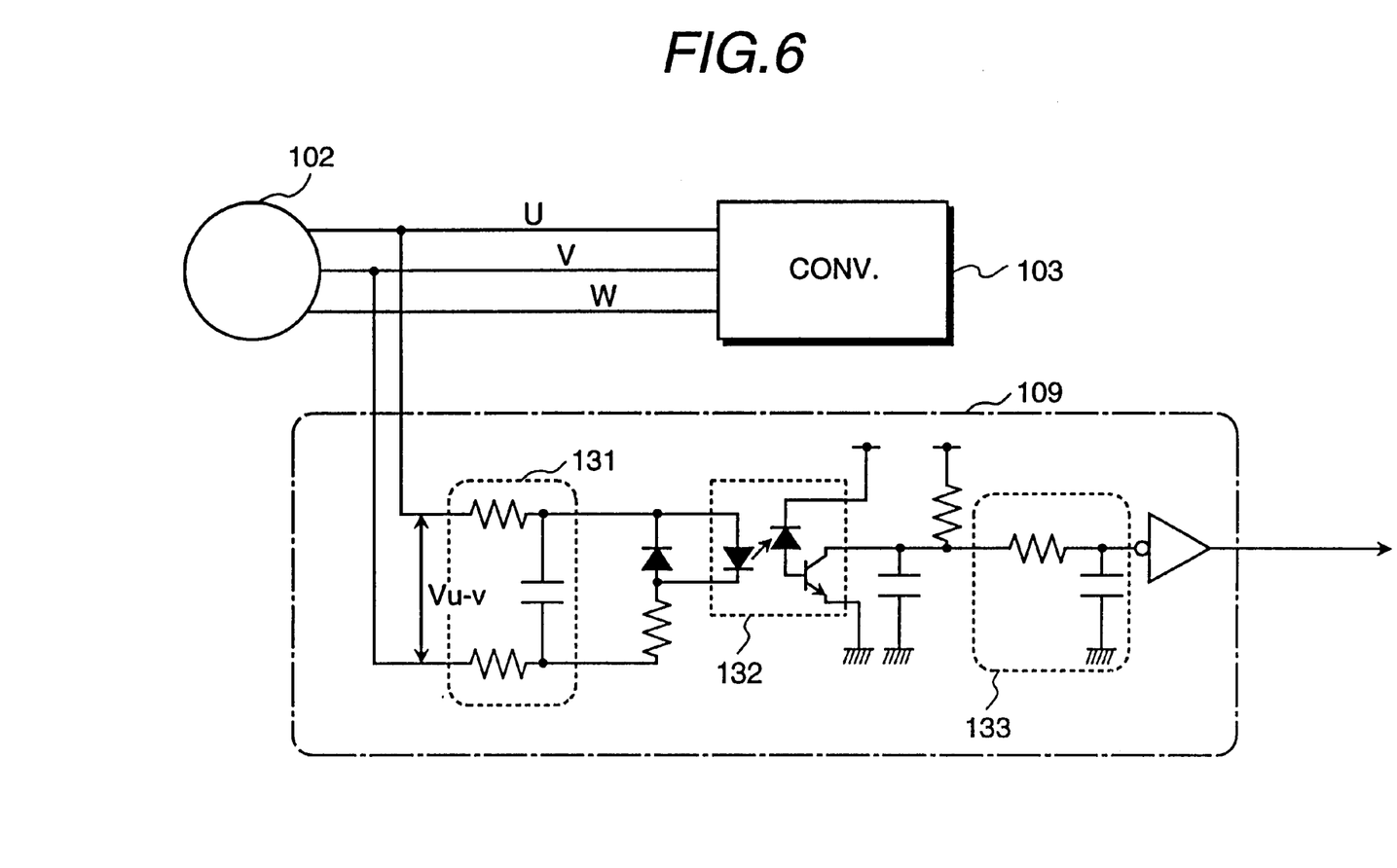
FIG. 6 schematically shows a circuit arrangement of a zero crossing point detector used in the embodiment as shown in FIG. 1A.

FIG. 6 shows the circuit arrangement of the zero crossing point detector 109. In the figure, reference numeral 131 denotes a primary low pass filter, reference numeral 132 a photo-coupler and reference numeral 133 a secondary low pass filter. The zero crossing point detector 109 detects the voltage between the phases U and V to produce a signal to the induced voltage calculator 118 for the stand-by mode.

The first low pass filter 131 not only removes harmonic components caused by the PWM control, but also serves to keep the voltage applied to the photo-coupler 132 within a predetermined constant level, as described next.

By way of example, a generator for an electric vehicle is required to produce a wide range of electric power from 0 to several ten kilowatts, and the number of rotations of such a generator also varies in the wide range from 0 to about ten thousand rpm. Under those conditions, the voltage generated by such generator changes between 0 and more than 300 volts.

Accordingly, it is desirable to provide any device, prior to the photo-coupler 132, that shows the high gain, during the low rotational speed of the generator 102 and hence the low induced voltage, and the low gain during the high rotational speed of the generator 102 and hence the high induced voltage.

The primary low pass filter 131 serves as such a device. To this end, its characteristics are selected as follows: i.e., the cut-off frequency thereof is lower than the frequency corresponding to the maximum electrical angular speed of the synchronous generator 102. However, as a matter of course, it is necessary to be higher than the frequency corresponding to the minimum electrical angular speed, at which the synchronous generator 102 is required to operate.

By the filter 131 having such characteristic, the photo-coupler 132 can be applied by the voltage of almost the constant level over the whole range of utilization.

With the circuit arrangement of the primary low pass filter 131 and the photo-coupler 132 as described above, the photo-coupler 132 produces such an output signal that is low, when the voltage between the phases U, V is positive, and high, when it is negative. Accordingly, if the delay in the primary low pass filter 131 is ignored, the falling edge of the output signal of the photo-coupler 132 can be regarded as corresponding to the zero crossing point.

Further, the secondary low pass filter 133 serves to remove noise from the output signal of the photo-coupler 132. The secondary low pass filter 133 has the cut-off frequency, which is higher than that of the primary low pass filter 131.

In the following, description will be made of a manner of detecting the phase of the position of magnetic poles in the stand-by mode, referring to FIGS. 7A to 7D, which are the explanatory drawings of the operation of the zero crossing point detector 109.

Because of the primary low pass filter 131, there occurs the phase delay in the detected U-V voltage. To generate light, the photo-coupler 132 needs to be supplied with more than a predetermined level of current, which means the sensitivity of a photo-coupler. This sensitivity of a photo-coupler also causes the delay. There occurs further phase delay caused by the secondary low pass filter 133. The total amount of delay caused by all the factors as mentioned above is represented by $\theta_{lag}$ in the following.

Figures 7A, 7B:
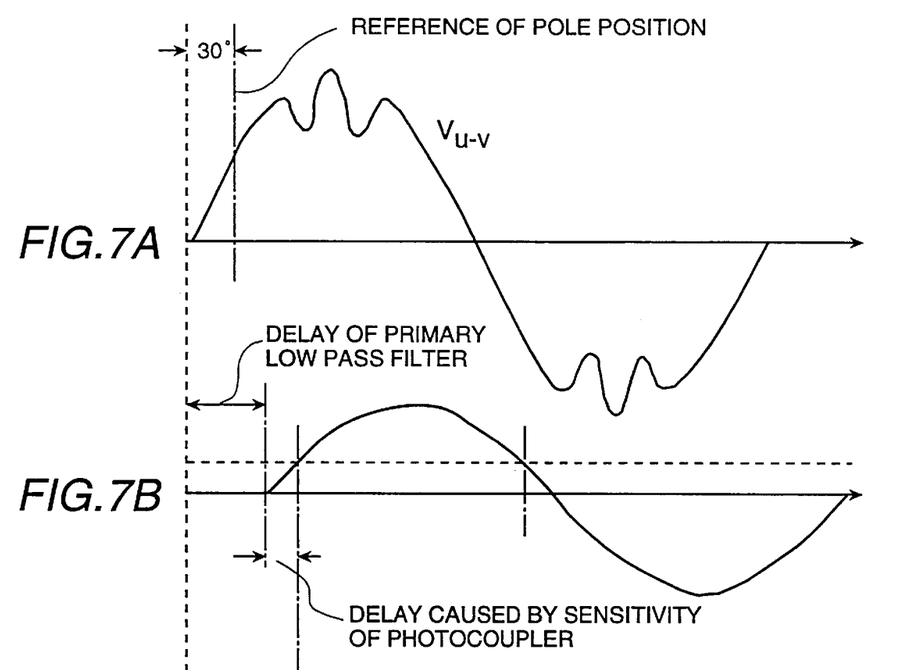
FIGS. 7A to 7D are explanatory drawings of the zero crossing point detector as shown in FIG. 6.
Figure 7C:
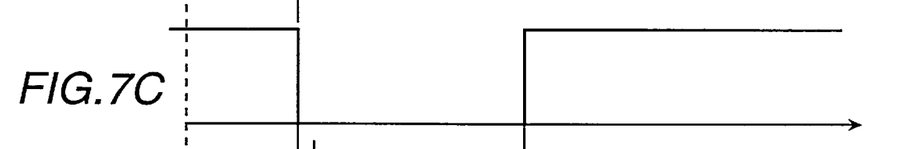
Figure 7D:
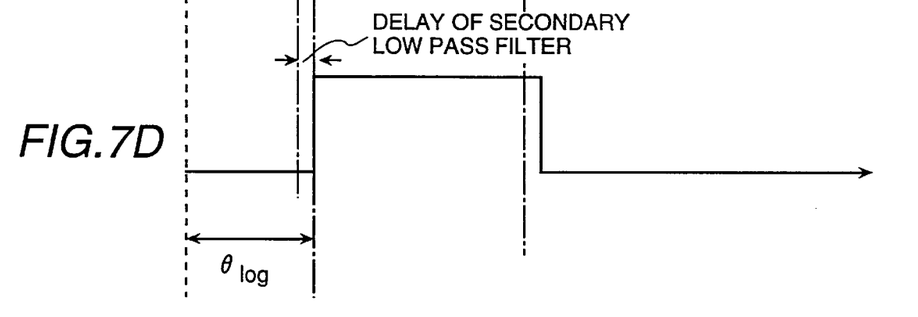

In FIG. 7A, the phase 0° of the magnetic pole position (the reference position of the magnetic pole position) is shown as a position of 30° delayed from the rising zero crossing point of the U-V voltage. In the relationship as shown, assuming that the phase of the output of the zero crossing point detector 109 is represented by $\theta_z$ and the phase of the magnetic pole position by $\theta_0$, the following equation is established:

$$\theta_0 = \theta_z + \theta_{lag} - \Pi/6 \text{(rad)} \tag{8}$$

The induced voltage phase calculator 118 for the stand-by mode (FIG. 1B) receives the output signal of the zero crossing point detector 109 and calculates the phase $\theta_z$ thereof. The manner of obtaining the phase $\theta_z$ is almost the same as in the voltage phase calculator 116 for the generation mode (FIG. 1B). Therefore, the method as shown in FIGS. 3A and 3B can be utilized. The difference of the calculator 118 for the stand-by mode from the calculator 116 for the generation mode is that the leading edge of the rectangular waveform should be detected and utilized, not the rising zero crossing point.

The phase information $\theta_{Vu}$ and the speed information $\omega_r$ produced by the induced voltage phase calculator 118 for the stand-by mode are led to the magnetic pole position phase calculator 119 for the stand-by mode, in which the phase of the magnetic pole position is calculated in accordance with the equation (8) as mentioned above. Since $\theta_{lag}$ depends only on the rotational speed of the synchronous generator 102, the phase of the magnetic pole position can be easily obtained by retrieving the table which stores $\theta_{lag}$ obtained in advance with respect to the rotational speed.

In this manner, the magnetic pole position is calculated based on the information from the zero crossing point detector 109, when the generator 102 initiates rotation, and it is calculated based on the information of current, when the synchronous generator 102 is continuing the generator operation. The calculation for such operation modes is changed by the mode switch-over device 120.

As described above, the phase of the magnetic pole position can be learned, if the phase of voltage is known. Theoretically, therefore, it is possible to calculate the phase of the magnetic pole position by using the induced voltage calculator 118 for the stand-by mode and the magnetic pole position phase calculator 119 for the stand-by mode. However, this is not practical because of the following reasons.

Firstly, since the output of the zero crossing point detector 109 changes stepwise, the manner as shown in FIG. 4 can not be used in order to detect a zero crossing point. Secondly, it is difficult to obtain the exact amount of delay $\theta_{lag}$, because the sensitivity widely varies for every photo-coupler. Thirdly, in order to take an analog voltage information in a microcomputer, there are required parts such as a transformer, an isolation amplifier and so on, which are large in size.

From the reasons as mentioned above, as shown in FIGS. 1A and 1B, it is practical that the zero crossing point detector 109 is utilized at the time of start, during which the rotational speed is relatively low and the error caused by the delay is also small, and the voltage instruction is utilized at the time of generation, with which the phase of the magnetic pole position can be exactly calculated.

For simplification, the foregoing explanation operates on the assumption that the output of the current sensor 108 is of an ideal sinusoidal waveform. Actually, however, the current signal is a sinusoidal signal with many harmonic components superimposed. The voltage instruction also has a waveform with harmonic components, since it is formed based on the current signal with such harmonic components.

If the detection of a zero crossing point is carried out by using the voltage instruction with such harmonic components, a chattering phenomenon occurs in the detection operation, with the result that it becomes impossible to detect the voltage period exactly.

The superimposition of such harmonic components is caused by the form of slots of a synchronous generator and electric noise. Since the frequency of electric noise is sufficiently high, compared with the electric angular frequency of the synchronous generator, such noise can be removed by an appropriate low pass filter without any decrease of the accuracy. On the other hand, the frequency of harmonic components caused by the form of the slots is as low as from several to several ten times the frequency of the original signal at highest. If such noise is intended to be removed by a low pass filter, the influence by the delay of the phase becomes so large as to not be ignored.

Next, there will be described the method of removing the influence of chattering phenomenon caused by the harmonic components.

Figure 8:
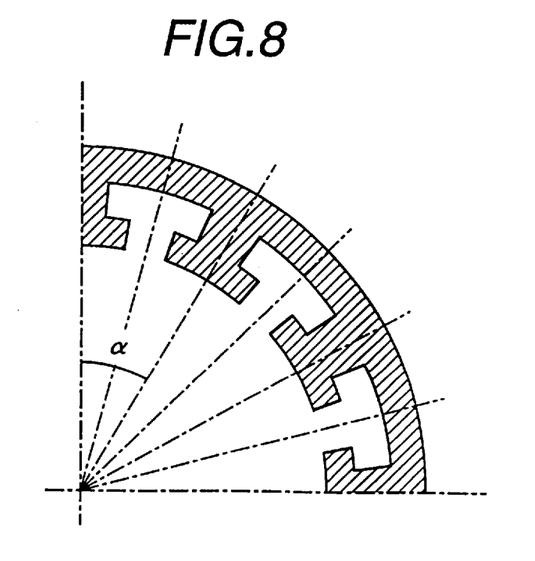
FIG. 8 is a sectional view showing a part of a stator of a synchronous generator.

FIG. 8 shows a part of a sectional view of a stator of a synchronous machine. Since in a synchronous machine, electromagnetic force occurs between winding coils and magnetic poles of a rotor, current ripple is caused every mechanical angle $\alpha$ of slots of the stator. If the mechanical angle a is converted into an electric angle $\gamma$ of the slot arrangement, $\gamma = p\alpha$ (p: number of pole pairs).

In this manner, since the current ripple occurs every electric angle $\gamma$ of the slot arrangement, the influence of the chattering phenomenon can be removed by using a mask of the length $\zeta$ which is longer than the electric angle $\gamma$ of the slot arrangement after the detection of the zero crossing point.

Figure 9A:
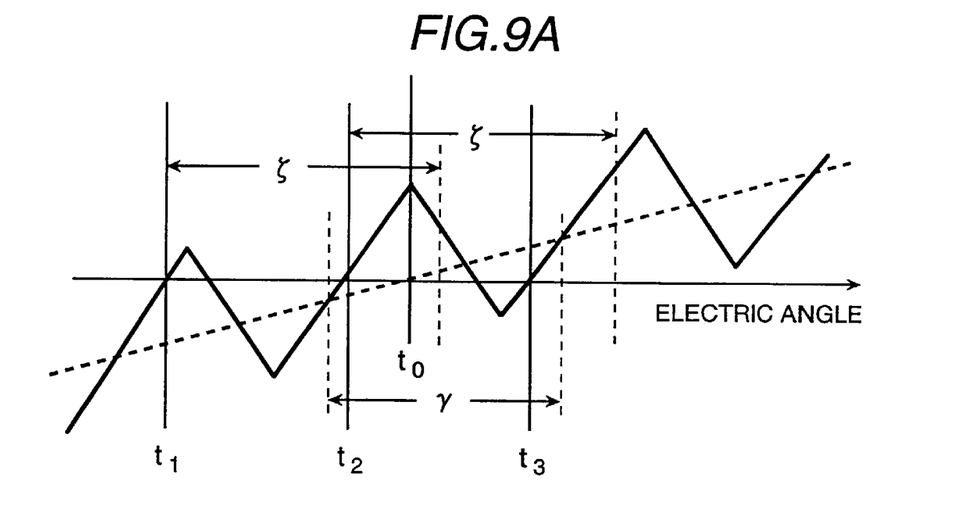
FIGS. 9A and 9B are drawings for explaining the principle of removing the influence of the chattering phenomenon occurring in detecting a zero crossing point.

FIG. 9A is a drawing for explaining the removal of the influence of chattering occurring around the phase 0° of the voltage, a thick broken line shows a part of a waveform of a fundamental wave of the voltage, and a thick solid line that of an actual waveform thereof.

As shown in the figure, a mask of the length $\zeta$ is established after the first occurrence $t_1$ of the zero crossing point. If $\zeta$ is set to be longer than the electric angle $\gamma$ of the slot arrangement, there occurs a zero crossing signal no more, even at the second occurrence $t_2$ of the zero crossing point.

Further, $\zeta$ of the mask is expressed in terms of the electric angle for simplification, however, it is equivalent that it is expressed in terms of time. In this manner, the influence of the chattering phenomenon can be removed by providing the zero crossing mask in the neighborhood of the phase 0° of the voltage.

Furthermore, according to this method, there occurs the difference between the detected point $t_1$ of the zero crossing and the actual point $t_0$ thereof, as shown in the figure. However, this difference can be easily corrected in the magnetic pole position phase calculator 117 for the generation mode. A table for the correction can be prepared in advance by the actual measurement during the parameter matching of the synchronous generator 102.

Figure 9B:
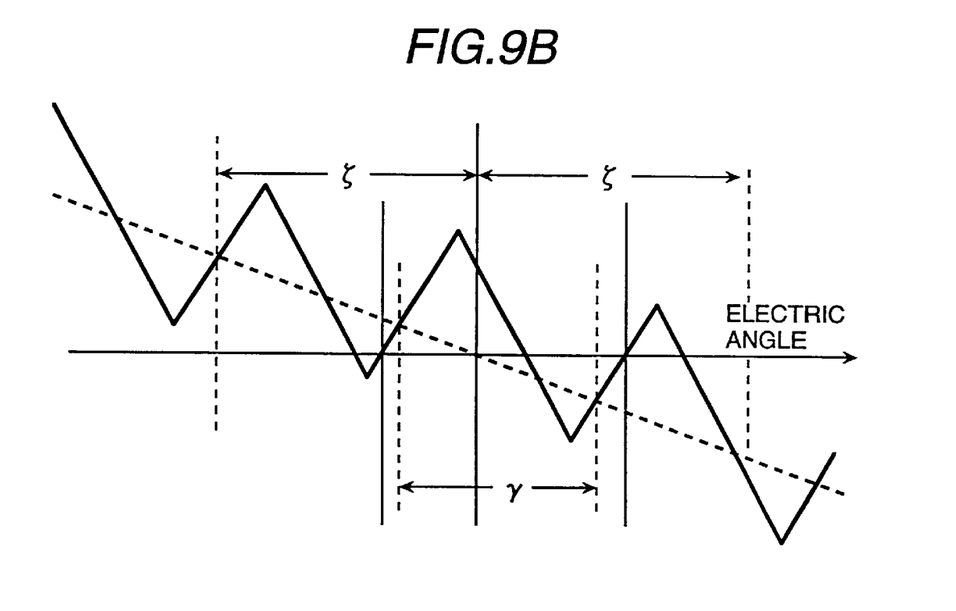

FIG. 9B is a drawing for explaining the removal of the influence of the chattering phenomenon occurring around 180°. In this case, all the points, at which the actual waveform (thick solid line) crosses zero, are masked. The magnitude of the ripple current is different, depending on a generator used, and the number of times of occurrence of chattering changes accordingly, with the result that the length of a mask must differ according to the system, to which the present invention is applied. However, the mask is necessary to be provided at least during the length corresponding to ±γ in terms of electric angle with the current phase angle 180° centered.

In the following, description will be made on another embodiment of the present invention.

The other embodiment has the same arrangement as shown in FIG. 1A, but only the converter controller 107 is different from that of the first embodiment. The converter controller 107 in the other embodiment is shown in FIG. 10.

Figure 10:
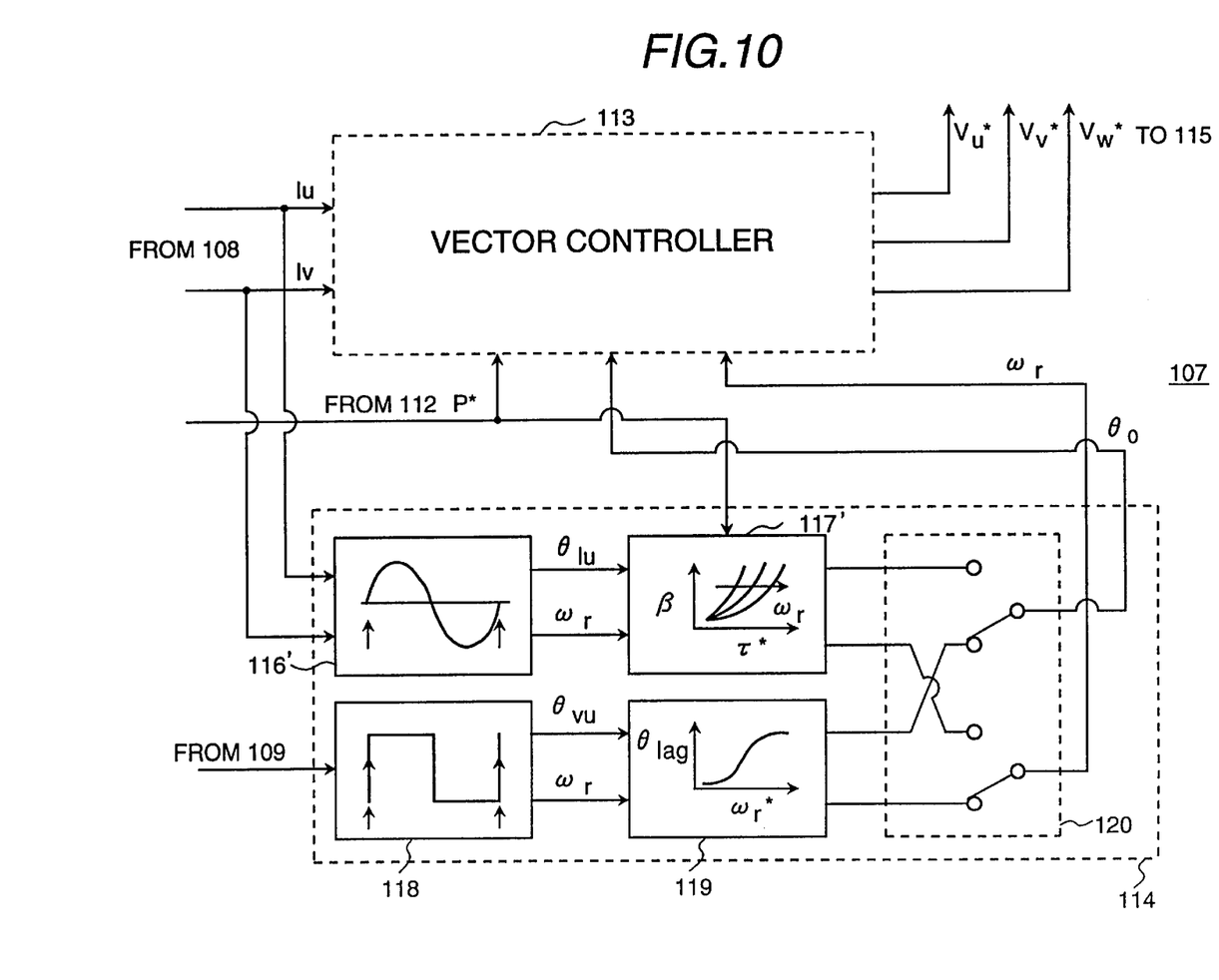
FIG. 10 shows a control apparatus for a synchronous generator according to another embodiment of the present invention, which however shows only a part corresponding to that as shown in FIG. 1B.

In FIG. 10, the output signals $I_u$, $I_v$ from the current sensor 108 are led not only to the vector controller 113, but also to current phase calculator 116' for the generation mode, in which the phase $\theta_{Iu}$ of the current and the angular speed $\omega_r$ are obtained. To obtain those, the current phase calculator 116' carries out the same processing as that of the voltage phase calculator 116 in FIG. 1B.

Receiving the current phase $\theta_{Iu}$ and the angular speed $\omega_r$, magnetic pole position phase calculator 117' for the generation mode obtains the advance angle β by looking up a table prepared in advance on the basis of P* and $\omega_r$. This is done in the same manner as the calculator 117 in the first embodiment.

Based on the thus obtained β, the position $\theta_0$ of the magnetic pole is calculated by the following equation:

$$\theta_{Iu} - \beta - \Pi/2 = \theta_0 \quad (9)$$

The remaining parts are the same as the first embodiment already described, referring to FIG. 1B. For simplification, therefore, further description will be omitted.

The zero crossing point detection described with reference to FIG. 4, the improvement of the accuracy of phase detection described with reference to FIG. 5, and the removal of the influence of chattering phenomenon described with reference to FIGS. 9A and 9B are all applicable to the embodiment as shown in FIG. 10.

As described above, the method that the position of magnetic poles is calculated based on information concerning the current has the advantage that the position of magnetic poles can be calculated, irrespective of the manner how to provide the voltage instruction.

By way of example, even in such a rough control apparatus that the phase of the voltage instruction fluctuates by several ten degrees for every sampling period, this method can perform the control without any problem, because the magnetic pole position is determined from the current signal on a real time basis.

We claim:

1. A control apparatus for a synchronous generator system, in which A.C. electric power produced by a synchronous generator is converted by a converter into D.C. electric power; comprising:

a voltage instruction generator (113) for generating voltage instructions ($V_u^*$, $V_v^*$, $V_w^*$) based on a reference (P*) for a power to be produced by the synchronous generator (102), currents ($I_u$, $I_v$) flowing through the synchronous generator (102) and information ($\theta_0$, $\omega_r$) concerning a position of magnetic poles of the synchronous generator (102); the converter (103) being operated in accordance with the thus generated voltage instructions ($V_u^*$, $V_v^*$, $V_w^*$);

a zero crossing point detector (109) for detecting the point, at which the voltage ($V_u$, $V_v$, $V_w$) of the synchronous generator (102) passes through a zero level of voltage; and a magnetic pole position calculator (114) for calculating the information ($\theta_0$, $\omega_r$) concerning the position of magnetic poles of the synchronous generator (102) on the basis of at least one of the voltage instructions ($V_u^*$, $V_v^*$, $V_w^*$) and the power reference (P*) when the synchronous generator (102) is under the generation mode, and on the basis of an output signal of said zero crossing point detector (109) when the synchronous generator (102) is under the stand-by mode.

2. A control apparatus for a synchronous generator system according to claim 1, in which said magnetic pole position calculator (114) comprises:

a first voltage phase calculator (116) for calculating the phase ($\theta_{Vu}$) of a zero crossing point of the voltage ($V_u$, $V_v$, $V_w$) and the angular speed ($\omega_r$) thereof based on the voltage instructions ($V_u^*$, $V_v^*$, $V_w^*$) and the power reference (P*); and a second voltage phase calculator (118) for calculating the phase ($\theta_{Vu}$) of a zero crossing point of the voltage ($V_u$, $V_v$, $V_w$) and the angular speed ($\omega_r$) thereof based on the output signal of said zero crossing point detector (109), wherein the phase ($\theta_0$) of the magnetic pole position is calculated on the basis of the phase ($\theta_{Vu}$) of the zero crossing point and the angular speed ($\omega_r$) thereof, and the thus obtained two sets of the phase ($\theta_{Vu}$) of the zero crossing points and the angular speed ($\omega_r$) are switched over in accordance with the operation mode of the synchronous generator (102).

3. A control apparatus for a synchronous generator system according to claim 2, in which the phase ($\theta_{Vu}$) of the zero crossing point and the angular speed ($\omega_r$) thereof, which are obtained by said first voltage phase calculator (116), are led to a first magnetic pole position phase calculator (117), in which the phase ($\theta_0$) of the magnetic pole position is calculated in accordance with the following equation:

$$\theta_{Vu} + \delta - \Pi/2 = \theta_0$$

wherein δ denotes an angle of the phase difference between an induced voltage (E) and a phase voltage ($V_u$), which is obtained in advance and stored in a table, which is looked up by the power reference (P* or τ*) and the angular speed ($\omega_r$).

4. A control apparatus for a synchronous generator system according to claim 2, in which the phase ($\theta_{Vu}$) of the zero crossing point and the angular speed ($\omega_r$) thereof, which are obtained by said second voltage phase calculator (118), are led to a second magnetic pole position phase calculator (119), in which the phase ($\theta_0$) of the magnetic pole position is calculated in accordance with the following equation:

$$\theta_z + \theta_{lag} - \Pi/6 = \theta_0$$

wherein $\theta_z$ is a phase angle of the output of said zero crossing point detector (109) and $\theta_{lag}$ is a phase delay occurring in said zero crossing point detector (109).

5. A control apparatus for a synchronous generator system according to claim 1, in which the zero crossing point of the voltage is the point that the voltage crosses a zero level from negative toward positive.

6. A control apparatus for a synchronous generator system according to claim 5, in which the zero crossing point $t_z$ is obtained in accordance with the following equation:

$$t_z=(V_-\cdot t_0+V_0\cdot t_-)/(V_-+V_0)$$

wherein $V_-$ is a voltage at the last time $t_-$ of the sampling point and $V_0$ is a voltage at the present time $t_0$ of the sampling point.

7. A control apparatus for a synchronous generator system according to claim 1, in which the zero crossing point detector comprises:
- a first low pass filter (131) receiving a voltage of the synchronous generator (102);
- a photocoupler (132) receiving an output of said first low pass filter (131); and
- a second low pass filter (133) receiving an output of said photocoupler (132),
- wherein the cut-off frequency of said first low pass filter (131) is selected at the frequency that is lower than the maximum electric angle frequency of the generator (102).

8. A control apparatus for a synchronous generator system according to claim 1, in which after the first occurrence of a zero crossing point, the zero crossing point detector (109) masks the detection output thereof for a predetermined time every time of occurrence of the zero crossing point; the predetermined time being longer than the period of time of ripple components included in the voltage of the synchronous generator (102).

9. A control apparatus for a synchronous generator system, in which A.C. electric power produced by a synchronous generator is converted by a converter into D.C. electric power; comprising:
- a voltage instruction generator (113) for generating voltage instructions ($V_u^*$, $V_v^*$, $V_w^*$) based on a reference (P*) for a power to be produced by the synchronous generator (102), currents ($I_u$, $I_v$) flowing through the synchronous generator (102) and information ($\theta_0$, $\omega_r$) concerning a position of magnetic poles of the synchronous generator (102); the converter (103) being operated in accordance with the thus generated voltage instructions ($V_u^*$, $V_v^*$, $V_w^*$);
- a zero crossing point detector (109) for detecting the point, at which the voltage ($V_u$, $V_v$, $V_w$) of the synchronous generator (102) passes through a zero level of voltage; and
- a magnetic pole position calculator (114) for calculating the information ($\theta_0$, $\omega_r$) concerning the position of magnetic poles of the synchronous generator (102) on the basis of the currents ($I_u$, $I_v$) and the power reference (P*) when the synchronous generator (102) is under the generation mode, and on the basis of an output signal of said zero crossing point detector (109) when the synchronous generator (102) is under the stand-by mode.

10. A control apparatus for a synchronous generator system according to claim 9, in which said magnetic pole position calculator (114) comprises:
- a first current phase calculator (116') for calculating the phase ($\theta_{Iu}$) of a zero crossing point of the current ($I_u$, $I_v$, $I_w$) and the angular speed ($\omega_r$) thereof based on the currents ($I_u$, $I_v$) flowing through the synchronous generator (102) and the power reference (P*);
- a first magnetic pole position phase calculator (117') for calculating the phase ($\theta_0$) of the magnetic pole position based on the phase ($\theta_{Iu}$) of the zero crossing point and the angular speed ($\omega_r$) thereof;
- a second voltage phase calculator (118) for calculating the phase ($\theta_{Vu}$) of a zero crossing point of the induced voltage and the angular speed ($\omega_r$) thereof based on the output signal of said zero crossing point detector (109), and
- a second magnetic pole position phase calculator (119) for calculating
- wherein the phase ($\theta_0$) of the magnetic pole position is calculated on the basis of the phase ($\theta_{Vu}$) of the zero crossing point and the angular speed ($\omega_r$) thereof, and
- the two sets of the phase ($\theta_{Vu}$) of the zero crossing points and the angular speed ($\omega_r$) are switched over in accordance with the operational mode of the synchronous generator (102).

11. A control apparatus for a synchronous generator system according to claim 10, in which the phase ($\theta_{Iu}$) of the zero crossing point and the angular speed ($\omega_r$) thereof, which are obtained by said first current phase calculator (116'), are led to a first magnetic pole position phase calculator (117'), in which the phase ($\theta_0$) of the magnetic pole position is calculated in accordance with the following equation:

$$\theta_{Iu}-\beta-\Pi/2=\theta_0$$

wherein $\beta$ denotes an angle of the phase difference between an induced voltage (E) and a phase current ($I_u$), which is obtained in advance and stored in a table, which is looked up by the power reference (P*) and the angular speed ($\omega_r$).

12. A control apparatus for a synchronous generator system according to claim 10, in which the phase ($\theta_{Vu}$) of the zero crossing point and the angular speed ($\omega_r$) thereof, which are obtained by said second voltage phase calculator (118), are led to a second magnetic pole position phase calculator (119), in which the phase ($\theta_0$) of the magnetic pole position is calculated in accordance with the following equation:

$$\theta_z+\theta_{lag}-\Pi/6=\theta_0$$

wherein $\theta_z$ is a phase angle of the output of said zero crossing point detector (109) and $\theta_{lag}$ is a phase delay occurring in said zero crossing point detector (109).

13. A control apparatus for a synchronous generator system according to claim 9, in which the zero crossing point of the voltage is the point that the voltage crosses a zero level from negative toward positive.

14. A control apparatus for a synchronous generator system according to claim 13, in which the zero crossing point $t_z$ is obtained in accordance with the following equation:

$$t_z=(V_-\cdot t_0+V_0\cdot t_-)/(V_-+V_0)$$

wherein $V_-$ is a voltage at the last time $t_-$ of the sampling point and $V_0$ is a voltage at the present time $t_0$ of the sampling point.

15. A control apparatus for a synchronous generator system according to claim 9, in which the zero crossing point detector comprises:
- a first low pass filter (131) receiving a voltage of the synchronous generator (102);

a photocoupler (132) receiving an output of said first low pass filter (131); and a second low pass filter (133) receiving an output of said photocoupler (132), wherein the cut-off frequency of said first low pass filter (131) is selected at the frequency that is lower than the maximum electric angle frequency of the generator (102).

16. A control apparatus for a synchronous generator system according to claim 9, in which after the first occurrence of a zero crossing point, the zero crossing point detector (109) masks the detection output thereof for a predetermined time every time of occurrence of the zero crossing point; the predetermined time being longer than the period of time of ripple components included in the voltage of the synchronous generator (102).

17. An electric vehicle having:

an engine;

a synchronous generator driven by said engine;

a converter, and a control apparatus therefor, for converting A.C. electric power produced by said synchronous generator into D.C. electric power;

a secondary battery for storing the converted D.C. electric power;

an inverter for inverting the D.C. electric power stored in said secondary battery into A.C. electric power; and an electric vehicle driving motor fed by the inverted A.C. electric power, wherein said control apparatus for said converter comprises:

a voltage instruction generator (113) for generating voltage instructions ($V_u^*$, $V_v^*$, $V_w^*$) based on a reference ($P^*$) for a power to be produced by the synchronous generator (102), currents ($I_u$, $I_v$) flowing through the synchronous generator (102) and information ($\theta_0$, $\omega_r$) concerning a position of magnetic poles of the synchronous generator (102); the converter (103) being operated in accordance with the thus generated voltage instructions ($V_u^*$, $V_v^*$, $V_w^*$);

a zero crossing point detector (109) for detecting the point, at which the voltage ($V_u$, $V_v$, $V_w$) of the synchronous generator (102) passes through a zero level of voltage; and a magnetic pole position calculator (114) for calculating the information ($\theta_0$, $\omega_r$) concerning the position of magnetic poles of the synchronous generator (102) on the basis of at least one of the voltage instructions ($V_u^*$, $V_v^*$, $V_w^*$) and the power reference ($P^*$) when the synchronous generator (102) is under the generation mode, and on the basis of an output signal of said zero crossing point detector (109) when the synchronous generator (102) is under the stand-by mode.

18. An electric vehicle having:

an engine;

a synchronous generator driven by said engine;

a converter, and a control apparatus therefor, for converting A.C. electric power produced by said synchronous generator into D.C. electric power;

a secondary battery for storing the converted D.C. electric power;

an inverter for inverting the D.C. electric power stored in said secondary battery into A.C. electric power; and an electric vehicle driving motor fed by the inverted A.C. electric power, wherein said control apparatus for said converter comprises:

a voltage instruction generator (113) for generating voltage instructions ($V_u^*$, $V_v^*$, $V_w^*$) based on a reference ($P^*$) for a power to be produced by the synchronous generator (102), currents ($I_u$, $I_v$) flowing through the synchronous generator (102) and information ($\theta_0$, $\omega_r$) concerning a position of magnetic poles of the synchronous generator (102); the converter (103) being operated in accordance with the thus generated voltage instructions ($V_u^*$, $V_v^*$, $V_w^*$);

a zero crossing point detector (109) for detecting the point, at which the voltage ($V_u$, $V_v$, $V_w$) of the synchronous generator (102) passes through a zero level of voltage; and a magnetic pole position calculator (114) for calculating the information ($\theta_0$, $\omega_r$) concerning the position of magnetic poles of the synchronous generator (102) on the basis of the currents ($I_u$, $I_v$) and the power reference ($P^*$) when the synchronous generator (102) is under the generation mode, and on the basis of an output signal of said zero crossing point detector (109) when the synchronous generator (102) is under the stand-by mode.

* * * * *